United States Patent [19]

Bunch

[11] 4,137,902
[45] Feb. 6, 1979

[54] ENERGY CONCENTRATOR SYSTEM

[76] Inventor: Jesse C. Bunch, 816 Easley St., Silver Spring, Md. 20910

[21] Appl. No.: 805,867

[22] Filed: Jun. 13, 1977

[51] Int. Cl.² .............................................. F24J 3/02
[52] U.S. Cl. ...................................... 126/271; 126/270
[58] Field of Search ............... 126/270, 271; 237/1 A; 60/641

[56] References Cited

U.S. PATENT DOCUMENTS

| 2,976,533 | 3/1961 | Salisbury | 126/270 |
| 4,030,890 | 6/1977 | Diggs | 126/271 |
| 4,065,053 | 12/1977 | Fletcher et al. | 126/271 |

Primary Examiner—Kenneth W. Prague
Attorney, Agent, or Firm—Morton J. Rosenberg

[57] ABSTRACT

A radiant energy concentrator system for maximizing the amount of radiation flux impinging and being absorbed in a particular area. The concentrator system includes a stationary spherical reflector which is fixedly secured to a base surface or ground element. A receiver having an extended length in a particular direction extends partially internal to the concave spherical envelope of the reflector and is adapted to be maintained in a direction substantially parallel to the incident radiation impinging and being reflected from the spherical reflector. The receiver is displaced in a manner maintaining the extended length of the receiver in a parallel direction to the incident radiation responsive to directional ray variations of the incident radiation impinging on the spherical reflector. Secondary radiation concentration devices are mounted on the receiver for reflecting radiation initially reflected from the receiver back onto the receiver for absorption.

30 Claims, 9 Drawing Figures

ENERGY CONCENTRATOR SYSTEM

BACKGROUND OF THE INVENTION

1. Field of the Invention

This invention relates to energy conservation systems. In particular, this invention relates to an energy concentrator system for maximizing the input of energy flux into a particular area. Still further, this invention relates to a radiant energy concentrator system utilizing a stationary reflector and a moveably actuated receiver system where incident energy is reflected from the reflector to the receiver. More in particular, this invention pertains to a radiant energy concentrator system whereby the receiver is moveable in a two axis rotation for maintenance of the extended length of the receiver in a parallel direction to incident radiation being applied from an external source to the spherical reflector. Still further, this invention relates to a radiant energy concentrator system where reflected radiant energy is applied along a line of focus of the spherical reflector to be intercepted by the receiver. Additionally, this invention pertains to a radiant energy concentrator system utilizing a secondary concentration device mounted on the receiver for re-reflecting radiant energy initially reflected from the receiver mechanism back to an outer wall of the receiver for absorption of such energy.

2. Prior Art

Energy concentrating systems are well known in the art. However, in some prior systems, the reflector portion of the system was moveable responsive to the directional variations of the incident radiation from an external source. In such prior systems, in order to achieve significant amounts of radiant energy from an external source such as the sun, large surface areas of the reflectors were necessary. Thus, extremely sturdy support members had to be utilized for movement support of the reflectors of such prior art systems. This increased the cost of such systems which had the disadvantage of making them uneconomical.

Additionally, in prior art systems, where the reflector was moveable, wind forces had to be taken into account. This further increased the necessity for high load bearing structural members and reduced the accuracy of the focusing of the reflected radiant energy.

In other prior art systems of energy concentration, the overall concept was to concentrate the energy to a point focus. In general, the concentration in this concept is through use of paraboloid reflector. In order to achieve focus to a point when utilizing a paraboloid of revolution, the incident radiation should be directed substantially parallel to the axis of the paraboloid. In such systems, when the incident radiation is to be maintained parallel to the axis of the paraboloid, the reflector must be displaced or a heliostat must be utilized which redirects the light or radiant energy to the paraboloid of revolution. In either case, it was found that the heliostat or the paraboloid of revolution must be displaced and mechanisms having large surface areas had to be moved. Thus, such prior systems had increased cost and a corresponding decrease in accuracy.

Additionally in some prior art systems, the rays being reflected to a receiver area, once having intercepted the receiver area were dissipated by reflection to the external environment. In some of these prior systems, there were no secondary concentrating devices in order to utilize the reflections from the receiver units. Thus, additional energy was wasted in the overall concentrating systems.

SUMMARY OF THE INVENTION

A radiant energy concentrator system which includes a reflector fixedly secured to a base surface for reflecting incident radiation impinging thereon from an energy source. A receiver having an extended length in a predetermined direction is maintained in a direction substantially parallel with the incident radiation. A secondary radiation concentration device is mounted on the receiver for further concentrating the reflected radiation to the receiver. The concentrator system includes a receiver displacement mechanism secured to the receiver for maintaining the extended length of the receiver in the parallel direction responsive to directional variations of the incident radiation.

DESCRIPTION OF THE PREFERRED EMBODIMENTS

Figure 1:
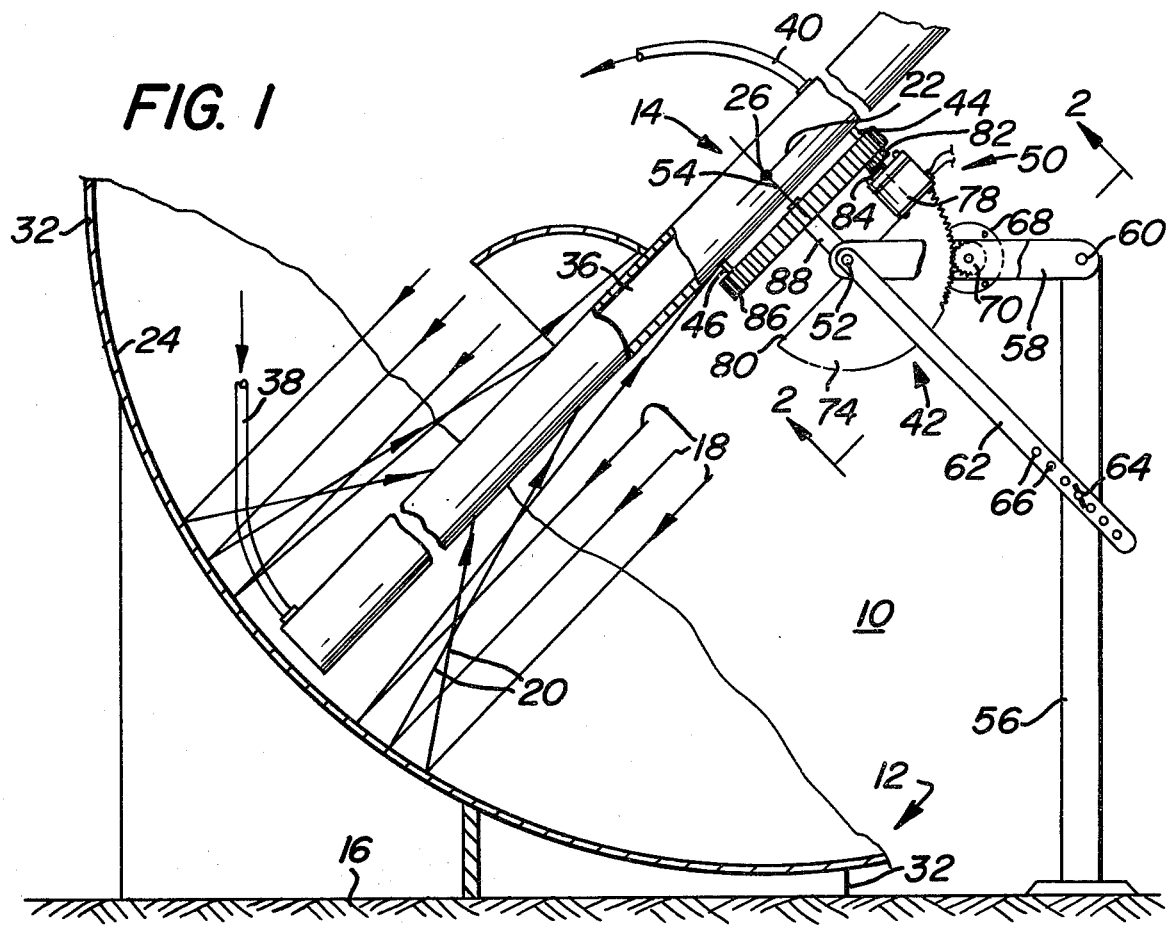
FIG. 1 is an elevational partially cut away view of the energy concentrator system.
Figure 3:
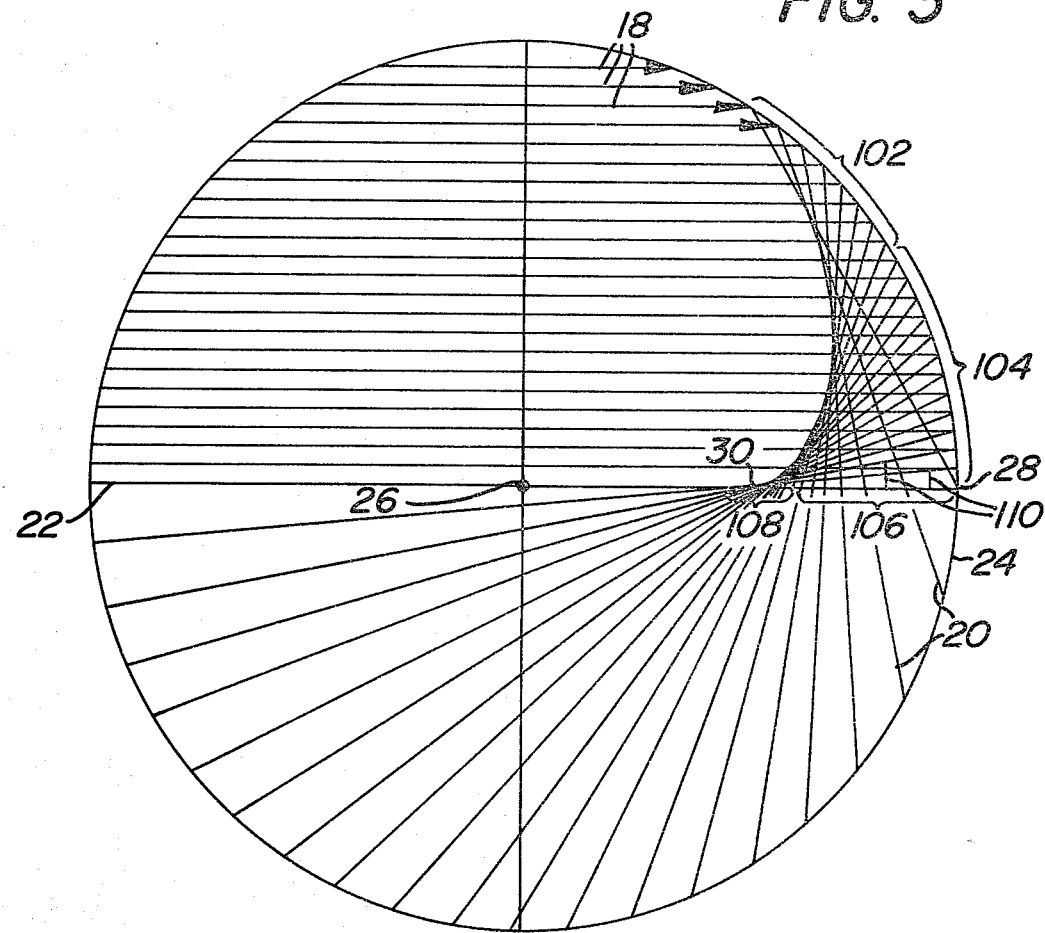
FIG. 3 is a graphical schematic diagram showing the incident and first reflected radiant energy rays impinging and reflecting from the spherical reflector.

Referring now to FIGS. 1 and 3, there is shown energy concentrator system 10 for reflecting incident radiation represented by substantially parallel rays 18 emitted from an energy source such as the sun, from reflector 12 to receiver 14. Additionally, and as will be shown in following paragraphs, secondary radiation concentrating mechanisms are mounted on receiver 14 for additionally capturing and concentrating reflected radiation rays 20 for further impingement on receiver 14. In overall concept, reflector 12 is maintained in fixed securement or positional orientation to ground or some other base surface 16 while receiver 14 is displaced in a manner such that the extended length of receiver 14 is maintained parallel to incident energy rays 18 as a function of the variational changes of the energy source as a further function of time.

As will be shown in following paragraphs, reflected energy rays 20 intercept receiver 14 substantially along a line defined by principal axis 22 of reflector 12. Principal axis 22 for purposes of this description is defined as being parallel to incident rays 18 and passing through center of curvature 26. In this manner, fluid or other material maintained within receiver 14 is provided with a maximization of energy for purposes to be described and are well known in the art.

Spherical mirrors in general, have been used to deflect or deviate a beam or ray of incident radiation 18. The center of curvature 26 of reflector 12 may be defined as the center of the envelope of receiver inner surface 24. In general, many spherical mirrors which are used for optical purposes are relatively flat, thus the dimensions of the mirror or reflector are small in comparison with the radius of the surface and such mirrors are defined as having small apertures. In such prior cases, incident energy rays 18 which are parallel to principal axis 22 converge through a common point, referred to as the principal focus of the mirror after reflection. If the mirror is concave, the principal focus of the mirror on receiver 14 has a distance which is located on principal axis 22 approximately halfway between the center of curvature 26 and the inner surface 24 of reflector 12.

In reflectors 12 which include reflector inner surfaces 24 having a relatively large aperture or in reflectors 12 where incident rays 18 have a relatively large inclination to principal axis 22, the images formed are somewhat imperfect and do not wholly focus at a point. Thus, incident rays 18 issuing from an energy source provide for a series of reflected energy rays 20 which cross or intercept principal axis 22 nearer or closer to inner surface 24 than those which are reflected from a center portion as is clearly seen in the schematic ray diagram of FIG. 3. The imperfection is generally referred to as spherical aberration. As can be seen in FIG. 3, there does exist a concentration of reflected energy rays 20 in the area 30 along principal axis 22 and such is referred to as a first order focus area.

First order focus area 30 lies approximately halfway between the center of curvature 26 and the reflector inner surface 24 contour as is shown, and lies in a line which passes through center of curvature 26 and is parallel to incident radiation rays 18. Additionally, it will be noted from FIG. 3 that a great or large proportion of reflected energy rays 20 intercept principal axis 22 in the region between first order focus 30 and reflector midpoint 28. Thus, by providing receiver 14, which is displaceable in a manner such that it may be maintained in a positional location parallel to incident energy rays 18, and close enough to inner surface 24 in order to intercept reflected rays 20, in an area between points 28 and first order focus 30, that a large percentage of incident energy rays 20 after reflection may be intercepted from spherical inner surface 24.

Additionally, reflected rays 20 from reflector 12 subsequent to impingement on receiver 14 only provide for a portion of the radiant energy to be absorbed by receiver 14. Thus, the ray diagram shown in FIG. 3 only provides for a first impingement schematic diagram of receiver 14 ray impingement. Dependent upon the optical as well as other thermo-physical properties of receiver 14, there is a large amount of impinging rays 20 which are in themselves reflected away from receiver 14. By including secondary ray concentrating devices mounted on receiver 14, to essentially capture and redirect reflected rays 20 back to receiver 14, there has been found a substantial increase in the energy efficiency of energy concentrator system 10. Such secondary concentrating devices are generally mounted on receiver 14 for further concentrating and capturing reflected radiation rays 20 for re-impingement on receiver 14. Such secondary concentrating devices will be described and defined in following paragraphs.

Referring now to FIG. 1, there is shown reflector 12 which is fixedly secured to ground or base surface 16. Reflector 12 is utilized for reflecting incident radiation 18 impinging on inner surface 24 from some external source such as the sun. Reflector 12 may be secured to reflector housing 32 which in turn may be fixedly mounted on base surface 16, or reflector 12 may be secured or otherwise fastened directly to ground 16 in a manner not important to the inventive concept as is herein described.

In general, where the sun is the main external energy source, reflector 12 is generally mounted in either a North/South or East/West orientation. Reflector 12 includes receiver inner surface 24 which is generally curvilinearly contoured and adapted to reflect incident energy rays 18 onto a line defining principal axis 22 as is shown in FIG. 3. In order to provide convergent reflected rays 20, inner surface 24 is concave in contour and directed toward the external energy source as is shown in FIG. 1. For overall maximization of the incoming energy reflection utilization and for uniform energy distribution, reflector 12 is formed into a substantially spherical contour.

Inner surface 24 may be formed of sheet metal polished to a high degree of reflectivity and may be formed of aluminum or some like material and possibly have a coating to protect oxidization aspects of any metal used thereon. Further, it will be noted that reflector 12 may include a spherical frame 32 upon which vacuum deposited metal may be adhered to provide inner surface 24, or in another mode, frame 32 may be mated to a reflective sheet material such as aluminized Mylar or like material to provide the appropriate reflection properties.

Figure 5:
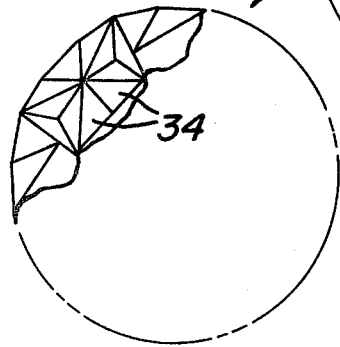
FIG. 5 is a frontal view of the spherical reflector having a geodesic type concave contour.

As shown in FIG. 5, reflector 12 may be formed in a geodesic dome type configuration having a plurality of reflective elements 34 of predetermined contour. Each of reflective elements 34 contiguously interface with a next successive reflective element 34 and includes a reflective surface facing the interior of the geodesic dome configuration in the manner clearly shown in FIG. 1.

Reflective elements 34 may be planar in contour and consist of mirror tiles or some like reflective element. Additionally, the overall contour of elements 34 to form a geodesic dome type configuration may be in the form of equilaterial triangles as shown in FIG. 5 or such may be in the contour of hexagons or pentagons in order to form the geodesic done type configuration. Where receiver 12 is formed of such reflective elements 34, the cost of producing such reflectors 12 are reduced in that elements 34 may be formed separate and distinct from any base frame 32 and may be inserted on-site of energy concentrator system 10. This leads to a pre-fabricated type system which is important in that the transportation costs as well as the labels costs for producing reflector 12 may be minimized to a substantial degree.

Receiver 14, as shown in FIG. 1, includes an extended length in a predetermined direction generally, but not necessarily defining a tubular member. As is important to energy concentrator system 10 of the instant invention, the extended length of receiver 14 is maintained in a direction substantially parallel to incident radiation 18 from the external source. Receiver 14 is positionally maintained coincident with a focal line defined by reflected radiant energy 20 as is provided by schematic diagram shown in FIG. 3.

Receiver 14 provides for a collector tube having internal chamber 36 within which material or fluid may be passed therethrough in order to heat such responsive to the interception of reflected rays 20 through a first reflection or through subsequent reflections by utilization of secondary concentrating devices mounted to receiver 14. In any event, the reflected rays 20 finally impinge on an outer wall of receiver or collector tube 14 and resulting in a high percentage of energy absorption. Fluid may be inserted through chamber 36 by incorporation of ingress conduit 38 and removed by egress conduit 40 through maintenance of a predetermined pressure head through external systems not important to the inventive concept as is herein defined. Thus, where fluid is passed through chamber 36, the fluid is heated by impingement and absorption of reflected rays 20 on collector tube 14 and then removed for utilization purposes.

Receiver 14 as is shown in FIG. 1, is directed to a simple passage type collector tube. Thus, fluid is inserted through conduit 38, heated within receiver 14 and removed for utilization through conduit 40. However, tube 14 may include a circulating fluid type collector having a plurality of fluid passages extending along an axis thereof for continued heating and heat exchange type transfers throughout the length of portions thereof of collector tube 14. Thus, receiver 14 may include an internal tubular member concentric with the overall contour of receiver 14. As an example, fluid may pass through the centrally disposed tube element in a direction of predetermined orientation. At the end of the centrally disposed concentric tube contour, the fluid passes to the outer annularly shaped tube section where it travels in an opposing direction and absorbs heat directly from the external wall of receiver 14.

In order to maintain the extended length of receiver 14 parallel with incident radiation rays 18, receiver displacement mechanism 42 is secured to receiver 14. This allows receiver 14 to be maintained in a parallel direction to rays 18 responsive to directional variations of incident radiation 18 from the external source. As will be seen in following paragraphs, receiver displacement mechanism 14 includes mechanisms for rotating receiver 14 about a pair of mutually perpendicular axes.

For purposes of reducing the power and strengths of material in displacing receiver 14, displacement mechanism 42 may be mounted to receiver 14 near or around the center of curvature 26 of reflector 12. This mounting may be made through lug elements 44 and 46 through bolting or other like securement mechanisms mounted directly to the external surface of receiver 14. This type of connection allows for a lower moment of force to be applied for displacement of receiver or collector tube 14.

Figure 2:
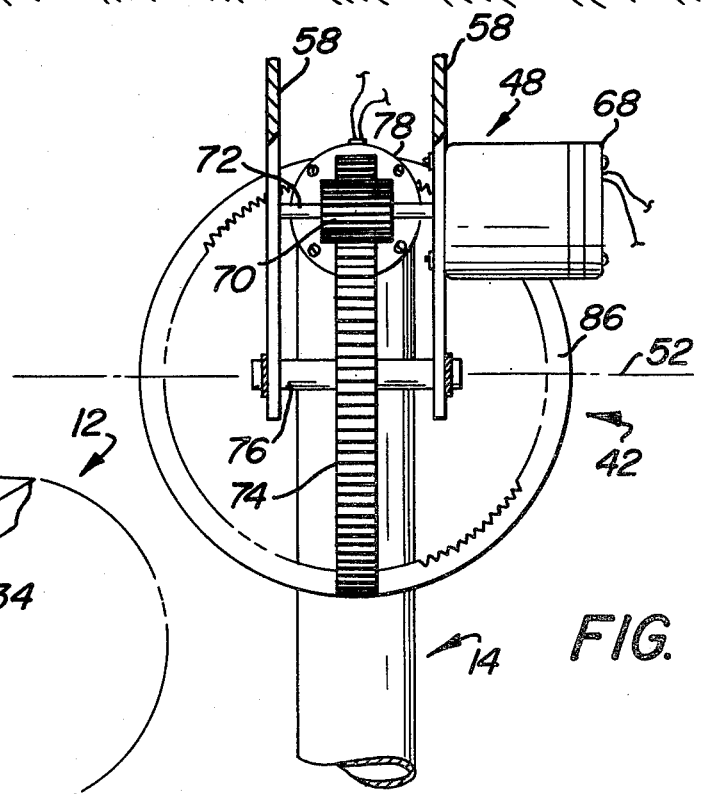
FIG. 2 is a sectional view of the receiver displacement mechanism taken along the section line 2—2 of FIG. 1.

Referring now to FIGS. 1 and 2, rotation of receiver or collector tube 14 about mutually perpendicular axes is accomplished by first motor displacement mechanism 48 and second motor displacement mechanism 50. Each of such mechanisms 48 and 50 respectively control motion of receiver 14 about axis line 52 and second axis line 54. First motor displacement mechanism 48 is mounted to vertically extending structural elements 56 which is secured to base surface 16 through bolting or some like mechanism. A pair of structurally maintaining arm sections 58 are pivoted to vertical frame member 56 at pivot point 60 as is shown.

Inclined arm member 62 is supported on vertical frame member 56 through bolt or screw member 65 which maintains inclined arm member 62 in a positionally fixed location. Additionally, inclined arm member 62 is bolted in a pivotal manner to arm sections 58 through first axis line 52 as is shown in FIG. 1. Thus, inclined positioning of arm sections 58 may be provided through incorporation of both members 64 within one of adjustable openings 66 formed through arm member 62.

First motor displacement mechanism 48 includes first motor 68 which may be of a DC type well-known in the art and may be bolted to one of arm sections 58 as is shown in FIG. 2. First drive gear 70 is mounted and secured to rotational shaft 72 extending from first motor 68. First drive gear 70 which may be a spur gear matingly engages first driven gear 74. Thus, first driven gear 74 is rotationally activated responsive to rotation of rotational shaft 72 acting through first drive gear 70.

As can be seen, first driven gear 74 is a spur gear formed into a semi-circle for purposes to be described in following paragraphs. Additionally, first driven gear 74 is rotationally mounted on first axis shaft 72 passing between and through opposing arm sections 58 to permit rotation of gear 74 about first axis line 52. Shaft 76 may be mounted to opposing arm sections 58 through threaded bolt securement or some like technique not important to the inventive concept as is herein described. Thus, from the foregoing description, actuation of first motor 68 has a resultant effect of causing rotational receiver 14 about first axis line 52.

Second motor displacement mechanism 50 includes second motor 78 which is secured through bolting or some like mechanism to first driven gear 74 on upper flattened surface 80. Second motor 78 is fixedly secured to first driven gear 74 in the manner shown in FIG. 1. Second drive gear 82 is fixedly mounted on rotational shaft 84 which is in turn secured to second motor 78. Second drive gear 82 may be a spur gear of appropriate tooth dimensions adapted to drive second driven gear 86 which is an internal spur gear. Thus, second driven gear 86 matingly engages second drive gear 82 responsive to rotation of shaft 84 extending from second motor 78. Inclined shaft 88 is mounted to second axis line 54 as is shown in FIG. 1. Receiver 14 is secured to second driven gear 86 through lug members 44 and 46 and thus receiver 14 is rotationally moveable responsive to rotational displacement of gear 86 about second axis line 54.

In this manner, receiver 14 is mutually rotatable about perpendicular axis lines 52 and 54 to provide a mechanism whereby tube or receiver 14 may be positioned parallel to incident radiation ray directions 18 responsive to the energy source location.

In operation, receiver 14 is displaced into parallel relation along its extended length with incident radiation energy 18 impinging on spherical reflector 12. Reflected radiant energy 20 is reflected from reflector 12 to tubular receiver 14 for interception of rays 20 by receiver 14 along a focus line as provided and shown in FIG. 3.

Referring now to FIG. 3, there is shown a graphical schematic diagram of incident energy rays 18 initially impinging on and showing a first energy ray 20 reflection from inner surface 24 of reflector 12. For purposes of discussion, it is assumed that collector tube or receiver 14 is positionally located along principal axis 22. Reflected rays 20 which are reflected in an intercepting path with receiver 14 after a first reflection from surface 24 are shown in FIG. 3.

A portion of inner surface 24 may be divided into reflection segments 102 and 104. First reflection rays 20 reflected from segment 102 intercept receiver 14 in collector tube segment 106. Similarly, reflection rays 20 reflected from segment 104 intercept receiver 14 in tube segment 108. Calculations show that approximately 58% of incident radiation energy is initially reflected into an intercepting path to segment 106, with approximately 42% being initially reflected into segment 108. Further, and of significant importance, is the fact that incident angle 110 of rays 20 intercepting segment 108 have a low angular value throughout a major portion of segment 104. After initial impingement and reflection from segment 108, radiant energy would be generally dissipated into the external environment.

Figure 6:
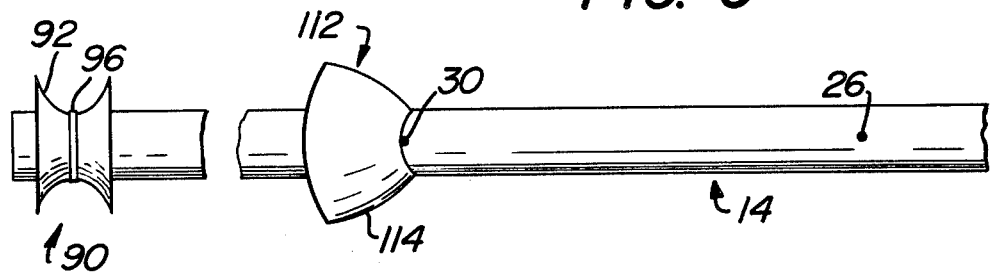
FIG. 6 is an elevational partially cut away view of an embodiment of the receiver showing a secondary concentrating device mounted to the receiver outer wall.

In order to increase the efficiency of energy concentrator system 10, it has been found that addition of secondary concentration devices may be utilized to capture the initial ray reflections from receiver 14 and re-reflect those rays back to receiver 14 for further concentrating effects. FIGS. 1 and 6 show one type of secondary concentrating device 112 mounted to receiver 14. Device 112 may take the form of cup element 114 mounted in secured fashion to an outer peripheral wall of collector tube 14. Additionally, cup 114 is a contour of revolution having an axis substantially coincident with the axis of tube 14. Cup element 114 may be a compound parabolic concentrator type shape having substantially parabolically shaped walls. Cup element 114 have mirror-like inner reflecting surfaces for reflecting rays 20 back onto tube 14 in order to maximize the total radiant energy impingement on tube 14.

As can be seen, cup element 114 is secured to tube 14 in the neighborhood of first order focus area 30. The largest diameter of secondary device 112 is generally formed sufficient in length to accept an initial reflected ray 20 from reflector 12. Cup member 114 may be increased in size to accept substantially any incident angle 110, as shown in FIG. 3, dependent on the physical conditions and size limitations of energy concentrator system 10.

Device 112 may be mounted to tube 14 through bolts, screws, or other fixed securement mechanisms not important to the inventive concept as is herein described. It will be further noted that a plurality of cup elements 114 may be mounted to tube 14 along and substantially coincident with the axis of receiver 14. Such cup elements 112 may be varying sizes in order to maximize the final radiant energy flux impinging on tube 14.

Figure 4:
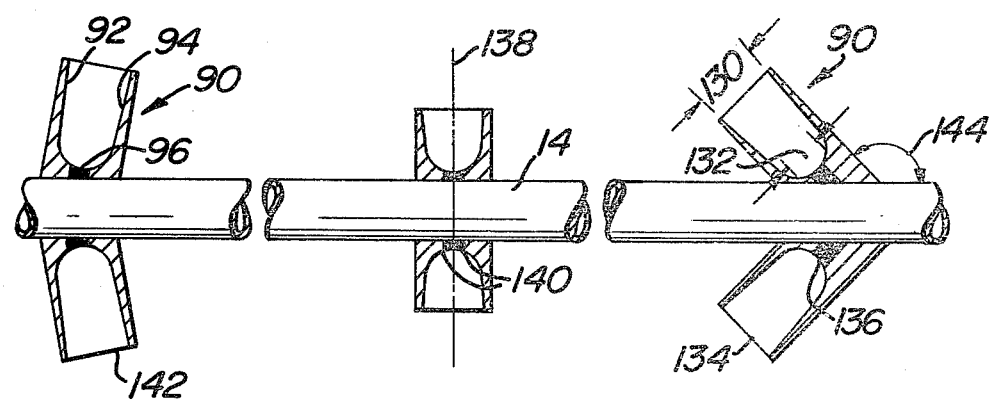
FIG. 4 is an elevational view of the receiver showing a plurality of compound parabolic concentrators mounted thereon.

Referring now to FIG. 4, there is shown another type of secondary radiation concentration mechanism 90 applied to the outer boundary wall of receiver 14 for concentrating reflected energy impinging on receiver 14. As can be seen, secondary concentration mechanism 90 is formed of at least a pair of parabolic reflecting surfaces 92 and 94 which extend in a generally outward direction from collector tube 14 for capturing reflected radiant energy 20 between surfaces 92 and 94.

Elements 92 and 94 are generally at least segments of parabolic surfaces of revolution and channel radiation impinging and being reflected thereon into region 96 which is a region of concentrated electro-magnetic radiation. Regions 96 passing around collector tube 14 may be mounted to solar cells or other like devices for utilizing the increased radiation energy impinging thereon. Such secondary concentration devices 90 may be referred to as compound parabolic concentrators. In specific, the basic theory of compound parabolic concentrators have been illustrated in detail in the magazine entitled "SOLAR ENERGY", Volume 18, Pages 93-111. However, it is not believed that the utilization of such secondary concentrator systems 90 have been adapted to provide structural elements mounted in combination with the energy concentrator system 10 shown and described in the foregoing paragraphs.

Each of compound parabolic concentrators 90 are mounted to a peripheral wall of collector tube 14. Radiation collection devices 90 have a radiation receiving opening 134 and an opposed radiation collecting surface 136. Radiation receiving opening 134 and radiation collecting surface 136 are joined by at least the sidewalls 92 and 94 having substantially parabolic profiles. Further illustrated in FIG. 4, it is seen that radiation collection devices 90 include pre-determined lateral dimensions 130 and 132. For optimization, a lateral dimension ratio of radiation collecting surface 132 to radiation receiving opening 130 is substantially equal to the sine of a half field of view of compound parabolic concentrator 90. For each compound parabolic concentrator 90, there exists axis line 138 which is substantially equidistant from each of sidewalls 92 and 94. In particular construction, devices 90 are formed such that each of parabolic wall profile 92 and 94 include a focus 140 at a position on the opposing sidewall at collecting surface 136. In this manner of construction, there is provided a highly efficient type of solar radiation collection device.

Additionally, and still further, concentrating system 90 may include a lens 142 secured to sidewalls 92 and 94 and positionally located within radiation receiving opening 134. Such lens 142 may be of the Fresnel type and further provides for concentration of reflected radiation 20 for passing and capturing within each of compound parabolic concentrators 90. As can be seen in FIG. 3, at any particular location on tube 14 along axis line 22, there is generally a fairly high degree of parallel rays 20 entering radiation receiving opening 134. Utilization of lens 142 positional within opening 134 having a focal point at or substantially near collecting surface 136 allows further concentration of rays 20 within concentrators 90 to increase the overall efficiency of system 10.

Additionally, and in further regard to FIG. 4, there is shown cut-away views of receiver tube 14. Each of secondary concentrating devices 90 in the form of compound parabolic concentrators may be angled in a particular fashion dependent upon the physical location of compound parabolic concentrators 90 on tube 14. Where the secondary concentrating device 90 is in the area 108 of tube 14, devices 90 may be inclined at a 90° angle to the extended length of tube 14 in order to accept a maximum amount of reflected rays 20. In opposition, as shown by the device 90 on the right side of tube 14 in FIG. 4, where such device 90 is located in area 106 of receiver 14, it is seen that secondary concentrating device 90 may include an oblique angle 144 in order to accept a maximization of reflected rays 20.

Still further, as is clearly seen in FIG. 6, compound parabolic concentrator cup members 114 may be placed in combination with secondary reflection devices 90 previously described. Such combinations may be mounted in secured manner to an outer wall of tube 14 as has been previously detailed.

Figure 8:
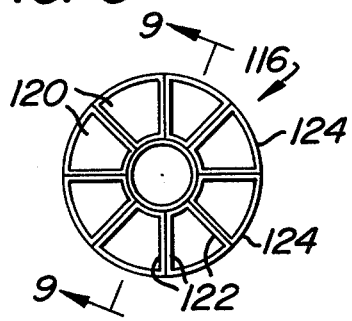
FIG. 8 is a sectional view of the cup elements shown in FIG. 7 taken along the section line 8—8 of FIG. 7; and, FIG. 9 is a sectional view of the cup elements shown in FIG. 8 taken along the section line 9—9 of FIG. 8.
Figure 7:
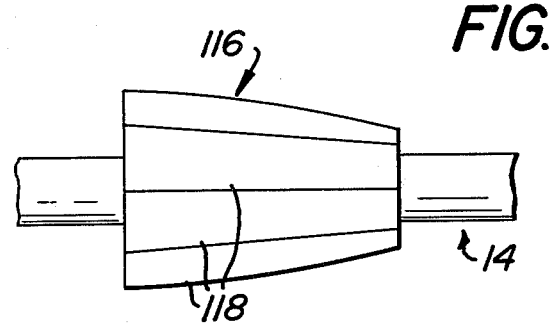
FIG. 7 is an elevational partially cut away view of an embodiment of the receiver mechanism showing a plurality of secondary concentrating cup elements mounted to the receiver outer walls.
Figure 9:
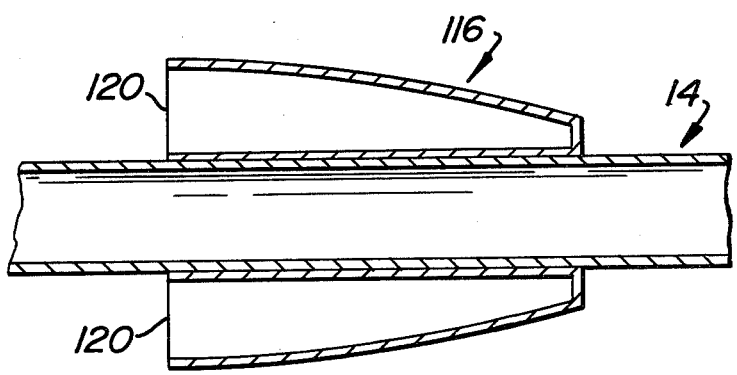

Another embodiment of energy concentrator system 10 is shown in FIGS. 8 and 9 where another type of secondary concentrating mechanism 116 is employed. Mechanism 116 includes a plurality of secondary cup elements 118 mounted in an interfacing manner each to the other around receiver 14 as is shown. Each of secondary cup elements 118 may have an open end 120 directed toward or facing incoming radiant energy 20. Each open end 120 may similarly include a lens for further concentrating any energy internal to mechanism 116. In this manner, reflected rays 20 from segment 104 of reflector inner surface 24 may be captured within an internal volume of secondary cups 118 and eventually be directed to the outer wall of receiver 14.

Outer walls 124 may include a contour approximating a compound parabolic concentrator contour for optimization of rereflected rays being directed to receiver 14. Elements 118 may be secured to receiver 14 through bolting, or other like mechanisms not important to the inventive concept as is herein described.

Thus, there has been shown a method of concentrating reflected radiant energy into a predetermined area by initially establishing stationary spherical reflector 12 on a base surface 16. In general, when incident radiation is initiated at an external source such as the sun and base surface is ground, reflector 12 may have a generally North/South or East/West orientation.

Moveable receiver 14 having an extended length in a pre-determined direction is provided for receiving reflected rays 20 from receiver in a surface 24. Moveable receiver 14 is established having a substantially linearly directed contour in its extended length direction. Linearly directed receiver 14 is provided having an extension at least within a line length defined between inner surface 24 and center of curvature 26 of spherical reflector 12.

Receiver 14 is generally displaced coincident with a focus line for interception of reflected radiant energy 20 being reflected from surface 24. Receiver 14 may be tubular in contour and is adapted to contain material to be heated within internal chamber 36 through which the material is passed.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases particular locations of elements may be reversed or interposed, all without departing from the spirit or scope of the invention as defined in the appended claims.

What is claimed is:

1. A radiant energy concentrator system, comprising:
   (a) reflector means fixedly secured to a base surface, said reflector means for reflecting incident radiation impinging thereon from an energy source;
   (b) receiver means having an extended length in a predetermined direction, said extended length being maintained in a direction substantially parallel with said incident radiation, said receiver means including collector tube means having an axis positionally locatable in a direction substantially parallel said incident radiation direction independent of said fixed reflector means;
   (c) secondary radiation concentration means mounted on said receiver means for further concentrating said reflected radiation to said receiver means; and,
   (d) receiver displacement means secured to said receiver means for displacing and maintaining said extended length of said receiver means in said parallel direction responsive to directional variations of said incident radiation.

2. The radiant energy concentrator system as recited in claim 1 where said secondary radiation concentration means is secured to an outer peripheral wall of said collector tube means for intercepting said reflected radiant energy.

3. The radiant energy concentrator system as recited in claim 1 where said secondary radiation concentration means includes cup means mounted to a peripheral wall of said collector tube means for intercepting radiant energy being reflected from said reflector means.

4. The radiant energy concentrator system as recited in claim 1 where said secondary radiation concentration means includes cup means mounted to a peripheral wall of said collector tube means, said cup means being formed by a paraboloid of revolution contour having an axis of revolution substantially coincident with said collector tube means axis.

5. The radiant energy concentrator system as recited in claim 4 where said cup means is positionally mounted to said collector tube means approximately at a positional location equal to one-half a radius of curvature of said reflector means.

6. The radiant energy concentrator system as recited in claim 1 where said secondary radiation concentration means includes radiation collection means mounted to a peripheral wall of said collector tube means, said radiation collection means having a radiation receiving opening and an opposed radiation collecting surface, said radiation receiving opening and said radiation collecting surface being joined by at least a pair of sidewalls having substantially parabolic profiles.

7. The radiant energy concentrator system as recited in claim 6 where said radiation collection means includes a lateral dimension ratio of said radiation collecting surface to said radiation receiving opening substantially equal to the sine of a half field of view of said radiation collection means.

8. The radiant energy concentrator system as recited in claim 7 where each of said sidewall parabolic profiles includes a focus at a position on the opposing sidewall at said collecting surface, each of said profiles having an axis line substantially equidistant from each of said sidewalls.

9. The radiant energy concentrator system as recited in claim 8 where each of said sidewalls includes an inner reflecting surface.

10. The radiant energy concentrator system as recited in claim 6 including lens means secured to said sidewalls and positionally located within said radiation receiving opening.

11. The radiant energy concentrator system as recited in claim 1 where said reflector means includes a curvilinearly contoured reflective surface adapted to reflect said incident radiant energy.

12. The radiant energy concentrator system as recited in claim 1 where said reflector means includes a concave contour reflective surface directed toward said energy source.

13. The radiant energy concentrator system as recited in claim 1 where said reflector means is a spherical reflector adapted to reflect said radiant energy.

14. The radiant energy concentrator system as recited in claim 1 where said reflector means includes a geodesic dome configuration having a plurality of reflective elements of predetermined contour, each of said reflective elements contiguously line interfacing with a next successive reflective element, each of said reflective elements having a reflective surface facing interior said geodesic dome configuration.

15. The radiant energy concentrator system as recited in claim 14 where said reflective elements are planar and triangular in contour.

16. The radiant energy concentrator system as recited in claim 14 where said reflective elements are planar and hexagonal in contour.

17. The radiant energy concentrator system as recited in claim 1 where said receiver means is positionally maintained coincident with a focal line defined by said reflected radiant energy.

18. The radiant energy concentrator system as recited in claim 17 where said collector tube means includes an extended length and being positionally displaced by said receiver displacement means in a direction parallel to said incident radiation direction.

19. The radiant energy concentrator system as recited in claim 18 where fluid is passed through said collector tube means, said fluid being heated by said reflected radiant energy impinging said collector tube means.

20. A radiant energy concentrator system, comprising:
 (a) reflector means fixedly secured to a base surface, said reflector means for reflecting incident radiation impinging thereon from an energy source;
 (b) receiver means having an extended length in a predetermined direction, said extended length being maintained in a direction substantially parallel with said incident radiation;
 (c) secondary radiation concentration means mounted on said receiver means for further concentrating said reflected radiation to said receiver means; and,
 (d) receiver displacement means secured to said receiver means for maintaining said extended length of said receiver means in said parallel direction responsive to directional variations of said incident radiation, said receiver displacement means including means for rotating said receiver means about a pair of mutually perpendicular axes.

21. The radiant energy concentrator system as recited in claim 20 where said reflector means is spherical in contour, said receiver displacement means being secured to said receiver means approximately at a center of curvature of said reflector means spherical contour.

22. The radiant energy concentrator system as recited in claim 20 where said rotation means includes:
 (a) first motor displacement means rotationally mounted to said base surface for rotating said receiver means about a first axis line; and,
 (b) second motor displacement means mounted to said first motor displacement means for rotating said receiver means about a second axis line normal about first axis line.

23. The radiant energy concentrator system as recited in claim 22 where said first motor displacement means includes:
 (a) first motor means;
 (b) first drive gear means secured to a rotational shaft extending from said first motor means; and,
 (c) first driven gear means matingly engaged to said first drive gear means responsive to rotation of said shaft.

24. A method for concentrating reflected radiant energy to a predetermined area, including the steps of:
 (a) establishing a stationary spherical reflector having a principal axis;
 (b) providing a movable receiver having an extended length in a predetermined direction including the step of establishing a substantially linearly directed receiver in said extended length direction;
 (c) establishing a secondary radiation concentrator mounted on said receiver for further radiating said reflected radiation to said receiver;
 (d) independently displacing said receiver into parallel relation along said extended length with an incident radiant energy direction impinging on said stationary spherical reflector; and,
 (e) reflecting said incident radiant energy from said reflector to said receiver.

25. The method of concentrating reflected radiant energy as recited in claim 24 where the step of establishing said linearly directed receiver includes the step or providing said extension at least within a line length defined between an inner surface and a center of curvature of said spherical reflector.

26. The method of concentrating reflected radiant energy as recited in claim 25 where said receiver extended length is displaced coincident with a focus line for interception of said reflected radiant energy.

27. The method of concentrating reflected radiant energy as recited in claim 26 where said receiver is tubular in contour, said receiver adapted to contain material to be heated.

28. A method for concentrating reflected radiant energy to a predetermined area, including the steps of:
 (a) establishing a stationary spherical reflector having a principal axis;
 (b) providing a movable receiver having an extended length in a predetermined direction;
 (c) establishing a secondary radiation concentrator mounted on said receiver for further radiating said reflected radiation to said receiver;
 (d) displacing said receiver into parallel relation along said extended length with an incident radiant energy direction impinging on said spherical reflector, said step of displacing said receiver including the step of pivoting said receiver about a pivot point approximately coincident with said principal axis of said spherical reflector; and,
 (e) reflecting said incident radiant energy from said reflector to said receiver.

29. The method of concentrating reflected radiant energy as recited in claim 28 where the step of pivoting includes the step of rotationally moving said receiver in a two-axis rotational mode.

30. The method of concentrating reflected radiant energy as recited in claim 29 where the step of establishing a stationary spherical reflector includes the step of forming an inner reflecting surface in a geodesic dome configuration, said inner surface having an envelope approximating a spherical surface.

* * * * *